United States Patent
Park

(10) Patent No.: US 6,978,322 B2
(45) Date of Patent: Dec. 20, 2005

(54) EMBEDDED CONTROLLER FOR REAL-TIME BACKUP OF OPERATION STATES OF PERIPHERAL DEVICES

(75) Inventor: Jin-Kwon Park, Suwon-shi (KR)

(73) Assignee: Samsung Electronics, Co., Ltd., (KR)

( * ) Notice: Subject to any disclaimer, the term of this patent is extended or adjusted under 35 U.S.C. 154(b) by 265 days.

(21) Appl. No.: 10/446,307

(22) Filed: May 28, 2003

(65) Prior Publication Data
US 2004/0039967 A1   Feb. 26, 2004

(30) Foreign Application Priority Data
Aug. 26, 2002 (KR) .................... 10-2002-0050489

(51) Int. Cl.$^7$ .............................................. G06F 3/00
(52) U.S. Cl. ..................... 710/16; 710/17; 710/18; 710/19; 710/23; 710/27; 710/28
(58) Field of Search .................... 710/16, 17, 18, 710/19, 23, 24, 25, 26, 27

(56) References Cited

U.S. PATENT DOCUMENTS

| | | | | |
|---|---|---|---|---|
| 5,255,238 A | * | 10/1993 | Ichige et al. ................ | 365/220 |
| 5,325,360 A | * | 6/1994 | Friedrich .................... | 370/453 |
| 5,428,770 A | | 6/1995 | Garner ....................... | 395/575 |
| 5,513,374 A | * | 4/1996 | Baji ........................... | 710/26 |
| 5,970,069 A | * | 10/1999 | Kumar et al. ............... | 370/402 |
| 6,000,035 A | * | 12/1999 | Matsushima et al. ....... | 713/320 |
| 6,212,625 B1 | * | 4/2001 | Russell ....................... | 712/217 |
| 6,363,501 B1 | | 3/2002 | Tobias et al. ................ | 714/30 |
| 6,457,074 B1 | * | 9/2002 | Gaillard et al. .............. | 710/25 |

* cited by examiner

Primary Examiner—Kim Huynh
Assistant Examiner—Alan S. Chen
(74) Attorney, Agent, or Firm—Mills and Onello, LLP

(57) ABSTRACT

An embedded controller includes a central processing unit, a memory interface for interface with an external memory, and a function block or peripheral device with a register for storing operation state information. The peripheral device includes a detection circuit, a storage unit, for example in the form of a FIFO, a multiplexer, and a direct memory access (DMA) controller. The state detection circuit activates a flag signal whenever the operation state information of the register is varied, and the FIFO stores the operation state information from the register in response to the flag signal. The multiplexer is controlled by the DMA controller and transmits the operation state information of the FIFO to an internal bus. As a result, the operation state information of the FIFO is stored in the external memory through the memory interface.

22 Claims, 6 Drawing Sheets

EMBEDDED CONTROLLER FOR REAL-TIME BACKUP OF OPERATION STATES OF PERIPHERAL DEVICES

FIELD OF THE INVENTION

The present invention relates to integrated circuit devices and, more particularly, to an embedded controller or a microcontroller.

BACKGROUND OF THE INVENTION

Despite its apparent similarity to microprocessors used in personal computers (PC), a microcontroller or an embedded controller offers a number of additional functions that are implemented on the same semiconductor substrate (i.e., chip). In a typical PC, a microprocessor performs basic operation functions while other integrated circuits perform other functions such as network communication, input/output transmission, peripheral device control, and the like. In a typical microcontroller, these additional functions are commonly established in a single integrated circuit. A typical microcontroller includes a central processing unit (CPU), a memory interface or a memory controller for interface with an external memory, and various function blocks or peripheral devices.

As the embedded controller or the microcontroller is deployed in a variety of applications, function blocks or peripheral devices for performing newly required functions may be added to the embedded controller or the microcontroller or may be substituted for other function blocks or peripheral devices. In a case where a function block is newly embedded in a microcontroller as a peripheral device, there is a need for verifying whether the function block operates correctly. The verification may optionally be done using a value stored in an internal state register for storing operation state information. The data read-out from the internal state register is to be used to debug the function block.

Conventionally, a debugging program is used to debug a function block. A central processing unit periodically or randomly reads out data stored in a state register of a function block or a peripheral device according to a debugging program. The read-out data is then stored in an external memory, and in turn used to debug the function block. Since many cycles are needed when the debugging program is used to access the state register of the function block, it is impossible to obtain varied operation state information of the state register in real time. For direct access to the data stored in the state register of the function block in real time, a specific test pin directly connected to the state register may be provided to a microcontroller. However, this approach requires that the test pin is unavailable for use during runtime operation of the microcontroller or an embedded controller.

A method for obtaining operation state information stored in a state register of a function block (or peripheral device states) by means of a scan structure is disclosed in U.S. Pat. No. 6,363,501 entitled "METHOD AND APPARATUS FOR SAVING AND LOADING PERIPHERAL DEVICE STATES OF A MICROCONTROLLER VIA A SCAN PATH", issued to Tobis et al., Mar. 26, 2002. This patent discloses the technique that registers in peripheral devices (or function blocks) are scan-connected in series to sequentially store values of the registers in an external memory. In this case, the values of the registers are obtained while the embedded controller or microcontroller is in a paused state. Thus, this approach does not provide for the debugging of function blocks or peripheral devices during real-time operation of the microcontroller.

A technique for providing a special test port into a microcontroller so as to check operation states of peripheral devices in real time is disclosed in U.S. Pat. No. 5,248,770 entitled "SINGLE-CHIP MICROCONTROLLER WITH EFFICIENT PERIPHERAL TESTABILITY", issued to Garner, Jun. 27, 1995. In this patent, a test port is directly connected to an external test apparatus and is used in direct communication with peripheral devices. In this manner, it is possible to directly access the peripheral devices via the test port. However, this technique demands additional test pins as well as an external test apparatus.

SUMMARY OF THE INVENTION

In view of the foregoing, the present invention provides a technique by which operation state information of function blocks or peripheral devices which are varied during each clock cycle can be obtained without the need for a high-priced test apparatus or through the use of test pins.

The present invention thus provides an apparatus for real-time backup of information stored in a state register of a peripheral device in an embedded controller.

Further, the present invention provides an apparatus for real-time backup of information stored in a state register of a peripheral device in an embedded controller without influencing the operation of the central processing unit (CPU), even though no test pin is used.

According to an aspect of the invention, a single-chip control device having a central processing unit (CPU) and a memory interface for interface with an external memory includes at least one function block, a first register for storing operation state information of the function block, a state detection circuit for activating a flag signal whenever the operation state information of the first register is varied, a storage unit, for example a FIFO, for storing the operation state information of the first register in response to the flag signal, and a control circuit for transferring the operation state information of the FIFO to an internal bus in response to the flag signal so that the operation state information of the FIFO may be stored in the external memory through the memory interface.

The control circuit may include a switch for transferring the operation state information of the FIFO to the internal bus and a direct memory access controller for generating the switch control signal in response to the flag signal.

The direct memory access controller may issue a bus request to the central processing unit upon activation of the flag signal. When use of the bus is approved, the direct memory access controller activates the switch control signal.

The state detection circuit may include a second register for storing operation state information output by the first register in synchronization with a clock signal and a comparator for activating the flag signal depending on whether an output of the first register is identical with that of the second register.

The first and second registers may constitute a shift register operating in synchronization with the clock signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

According to the present invention, a state register for storing operation state information is provided in a function block (or function blocks) or a peripheral device (or peripheral devices) of an embedded controller or a microcontroller. Whenever operation state information stored in the state register is varied, a state detection circuit stores the varied information in a temporary storage device, for example a FIFO. A direct memory access. (DMA) controller transfers the information stored in the FIFO to an external memory by means of communication with a central processing unit (CPU). Such a backup structure makes it possible to store all operation state information of function blocks in an external memory in real time without affecting operation of the central processing unit even though additional test pins are not used. The information stored in the external memory may be used, for example, to debug the function blocks or peripheral devices.

An embedded controller or a microcontroller according to a first embodiment of the present invention is now described below with reference to FIG. 1.

Figure 1:
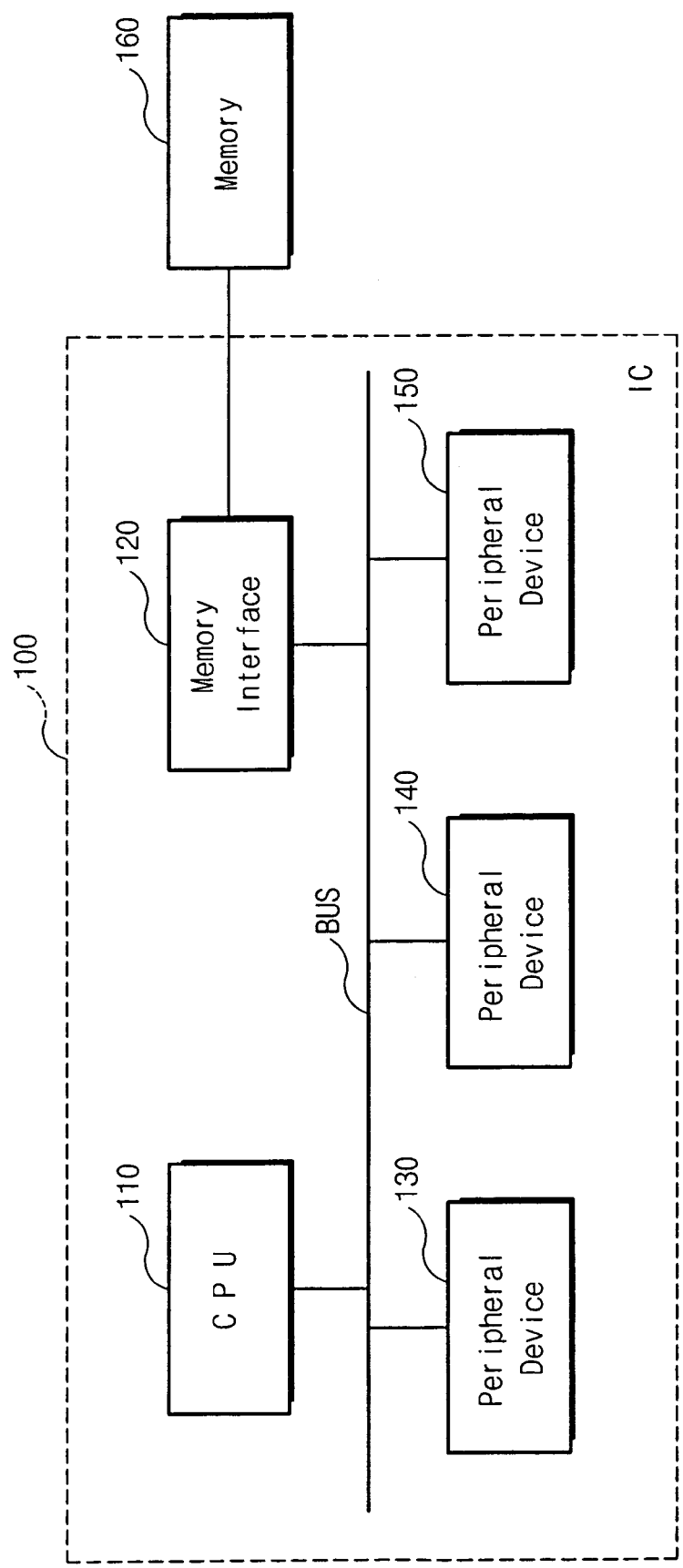
FIG. 1 is a block diagram of an embedded controller or microcontroller according to a first embodiment of the present invention.

Referring to FIG. 1, an embedded controller or microcontroller 100 includes an internal bus denoted as "BUS" and is coupled to an external memory 160. A central processing unit (CPU) 110 operating as an execution unit, a memory interface 120 operating as a memory controller, and a plurality of peripheral devices 130, 140, and 150 operating as a function blocks are coupled to the internal bus BUS. All components of the embedded controller or microcontroller 100 are provided on the same semiconductor substrate (or chip).

The peripheral devices 130, 140, and 150 may be substituted for other peripheral devices according to the application of the embedded controller or microcontroller 100. Alternatively, new peripheral devices may be embedded in a microcontroller according to the application of the embedded controller or microcontroller 100. That is, in the event that operation of peripheral devices newly embedded in a microcontroller is not verified, the new peripheral devices must be debugged using their operation state information so that they may normally operate. In case of the present invention, operation state information stored in a state register of a peripheral device is stored in an external memory 160 in real time by means of a direct memory access function, which is now explained in detail. The operation state information stored in the external memory 160 is used, for example, to debug peripheral devices.

Of the peripheral devices shown in FIG. 1, one peripheral device is now described in detail with reference to FIG. 2.

Figure 2:
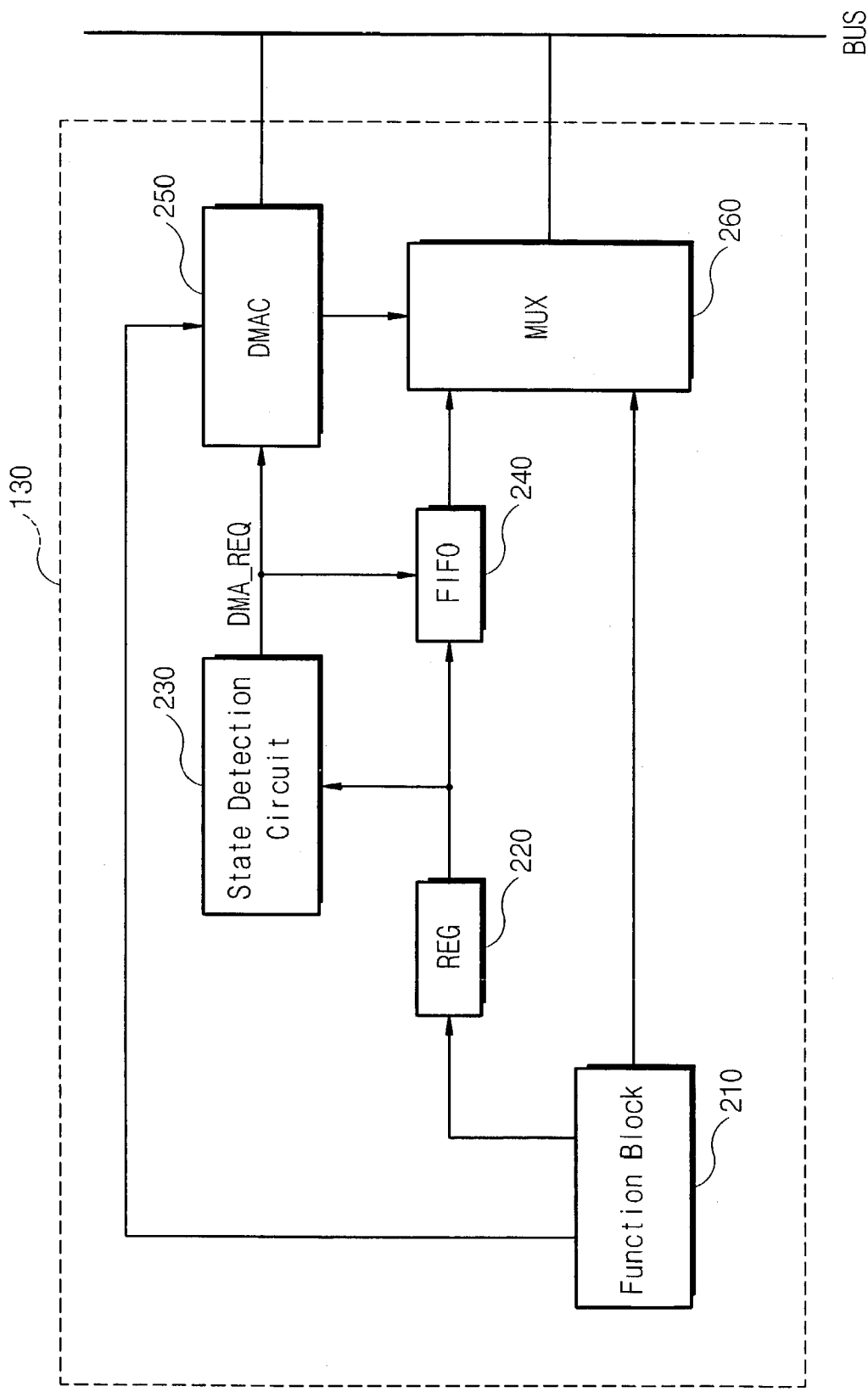
FIG. 2 is a block diagram of one of the peripheral devices among the peripheral devices shown in FIG. 1.

Referring to FIG. 2, a peripheral device 130 is coupled to the internal bus BUS and includes a function block 210, a state register 220, a state detection circuit 230, a FIFO 240, a direct memory access controller (hereinafter referred to as "DMA controller") 250, and a multiplexer 260. The function block 210 operates depending upon a predetermined treatment procedure and stores operation state information of each step and/or the last step of the treatment procedure in the state register 220. In the case where the information stored in the state register 220 is traced in real time, the peripheral device 130 may be debugged quickly and easily.

Figure 3:
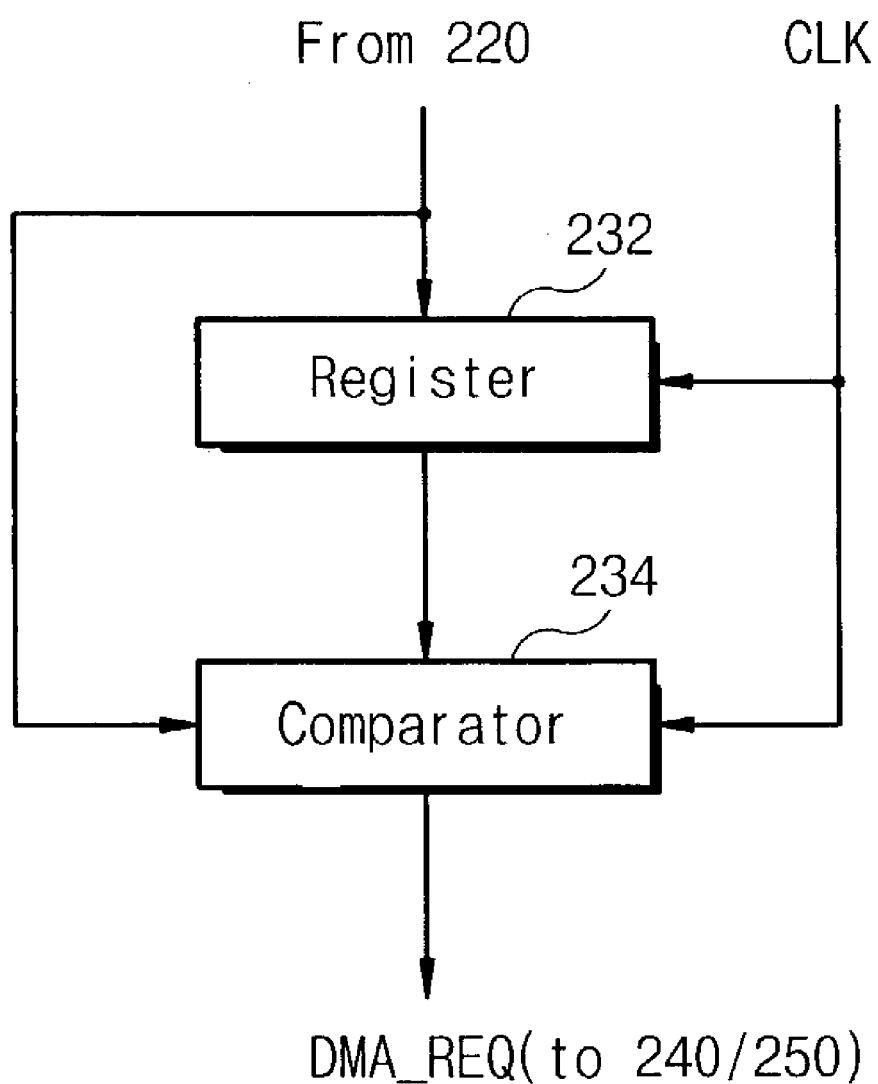
FIG. 3 illustrates a preferred embodiment of the state detection circuit shown in FIG. 2.

The state detection circuit 230 detects whether the value of the data stored in the state register 220 is varied, and activates a DMA request signal DMA_REQ depending upon the detection result. For example, when the data value is varied, the DMA request signal DMA_REQ is activated to have a pulse shape. On the other hand, when the data value is not varied, the DMA request signal DMA_REQ is maintained in a deactivated state. The state detection circuit 230 has a register 232 for storing an output of the state register 220 and a comparator 234 for comparing the output of the state register 220 with an output of a register 232 in the state detection circuit 230, as shown in FIG. 3. For example, when positive input values are different from each other, the comparator 234 activates the DMA request signal DMA_REQ to be high during one clock cycle. The size of the register 232 is equal to that of the state register 220. The registers 220 and 232 operate as a shift register operating in synchronization with a clock signal CLK.

Returning to FIG. 2, the FIFO 240 operates as a temporary storage device to receive the operation state information stored in the state register 220 when the DMA request signal DMA_REQ is activated. That is, whenever the data value of the state register 220 is varied, the varied data value is stored in the FIFO 240. The FIFO 240 is, for example, of a size large enough to store all varied values, even if the data value of the state register 220 are varied many times. Here the FIFO 240 is referred to as a "FIFO buffer" or "FIFO register" and may be constructed using flip-flops, a memory or other components which are well known in the art. The DMA controller 250 communicates with the central processing unit 110 through the internal bus BUS. Namely, the DMA controller 250 requests use of the bus from the central processing unit 110 when the DMA request signal DMA_REQ from the state detection circuit 230 is activated. When use of the bus is approved, the DMA controller 250 generates a selection signal SEL. Likewise, when there is a DMA request from the function block 210, the DMA controller 250 communicates with the central processing unit 230 to generate the selection signal SEL. For example, when the use of the bus is approved according to the DMA request from the state detection circuit 230, the DMA controller 250 controls a multiplexer 260 so that an output of the FIFO 240 may be connected to the internal bus BUS. As a result, data from the FIFO 240 is to be stored in the external memory 160 through the memory interface 120. To the contrary, when the use of the bus is approved according to the DMA request of the function block 210, the DMA controller 250 controls the multiplexer 260 so that an output of the function block 210 may be connected to the internal bus BUS.

In this embodiment, from the standpoint of the DMA controller 250 shown in FIG. 2, it is substantially identical with a conventional DMA controller except that DMArequesting peripheral devices increase in number. Although not shown in the drawing, the DMA controller 250 includes control logic, a data bus buffer, an address bus buffer, an address register, a word counter register, and a control register. The peripheral device 130, and the state detection circuit 230, the FIFO 240, and the multiplexer 260 are added to the DMA controller 250 that is originally provided into the peripheral device 130. In this manner, it is possible to realize an apparatus capable of backing up the operation state information of a state register in a peripheral device into external memory. In the case where a DMA controller 250 is not embedded in the respective peripheral devices 130, 140, and 150, a new DMA controller is added for realizing the apparatus for backing up the operation state information of a state register in a corresponding peripheral device into an external memory. Alternatively, a DMA controller of a microcontroller or an embedded controller may be used.

Figure 4:
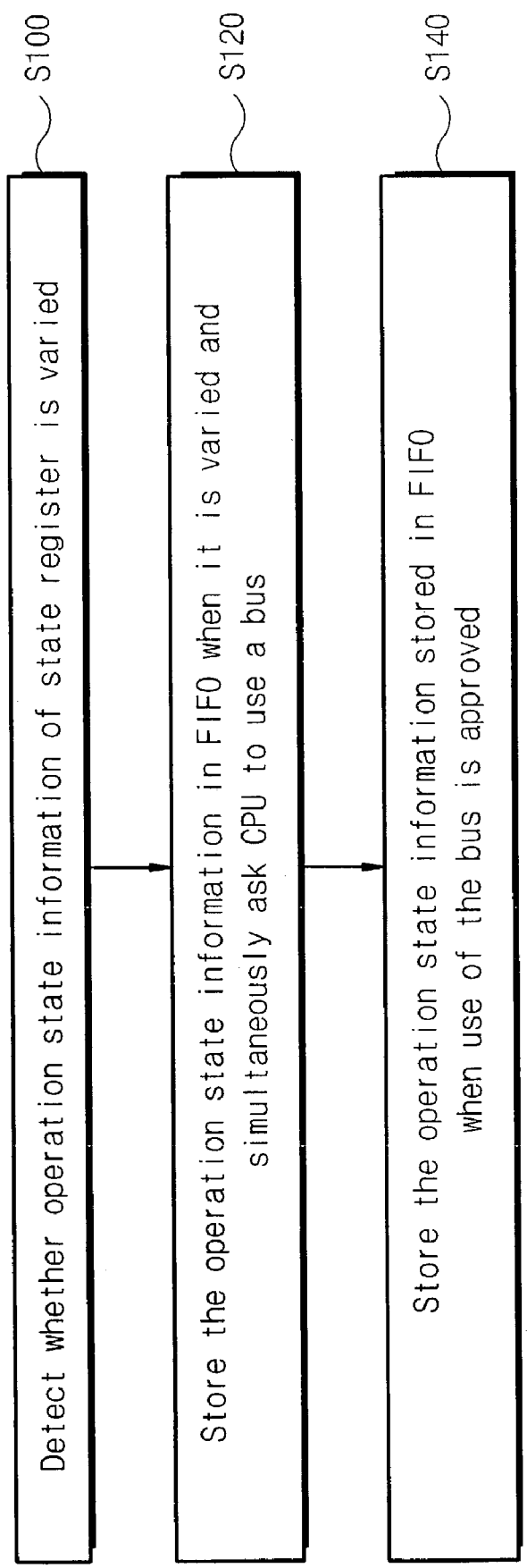
FIG. 4 is a flow diagram of a method for storing operation state information of a state register of a peripheral device in an external memory according to the present invention.

A flowchart showing the steps of storing operation state information of a state register in a peripheral device in an external memory is illustrated in FIG. 4. An operation state information backup procedure according to the invention is now described below with reference to the FIGS. 1–4.

First, a state detection circuit 230 determines whether the operation state information stored in a state register 220 of a peripheral device 130 is varied (S100). Next, when the operation state information of the state register 220 is varied, it is stored in a FIFO 240 and a bus request is issued to the central processing unit (CPU) 110 at the same time (S120). More specifically, when the operation state information of the state register 220 is varied, the state detection circuit 230 activates a DMA request signal DMA_REQ. The FIFO 240 stores the varied operation state information of the state register 220 depending upon the activation of the DMA request signal DMA_REQ. At the same time, the DMA controller 250 issues a bus request to the CPU 110. Finally, when the use of the bus is approved, the DMA controller 250 controls the multiplexer 260 such that data stored in the FIFO 240 is transmitted to the internal bus BUS. The data transmitted to the internal bus BUS, i.e., the operation state information of the state register 220, is stored in an external memory 160 according to conventional means (S140).

As understood by the foregoing, when the operation state information of the state register 220 in the peripheral device 130 is varied, all varied operation state information is stored in the external memory 160 depending upon the control of the DMA controller 250. That is, all operation state information of the state register 220 is stored in the external memory 160 in real time depending on the control of the DMA controller 250. The peripheral device 130 may thus be readily debugged using the data stored in the external memory 160.

A peripheral device according to a modified embodiment of the present invention is now described below with reference to FIG. 5.

Figure 5:
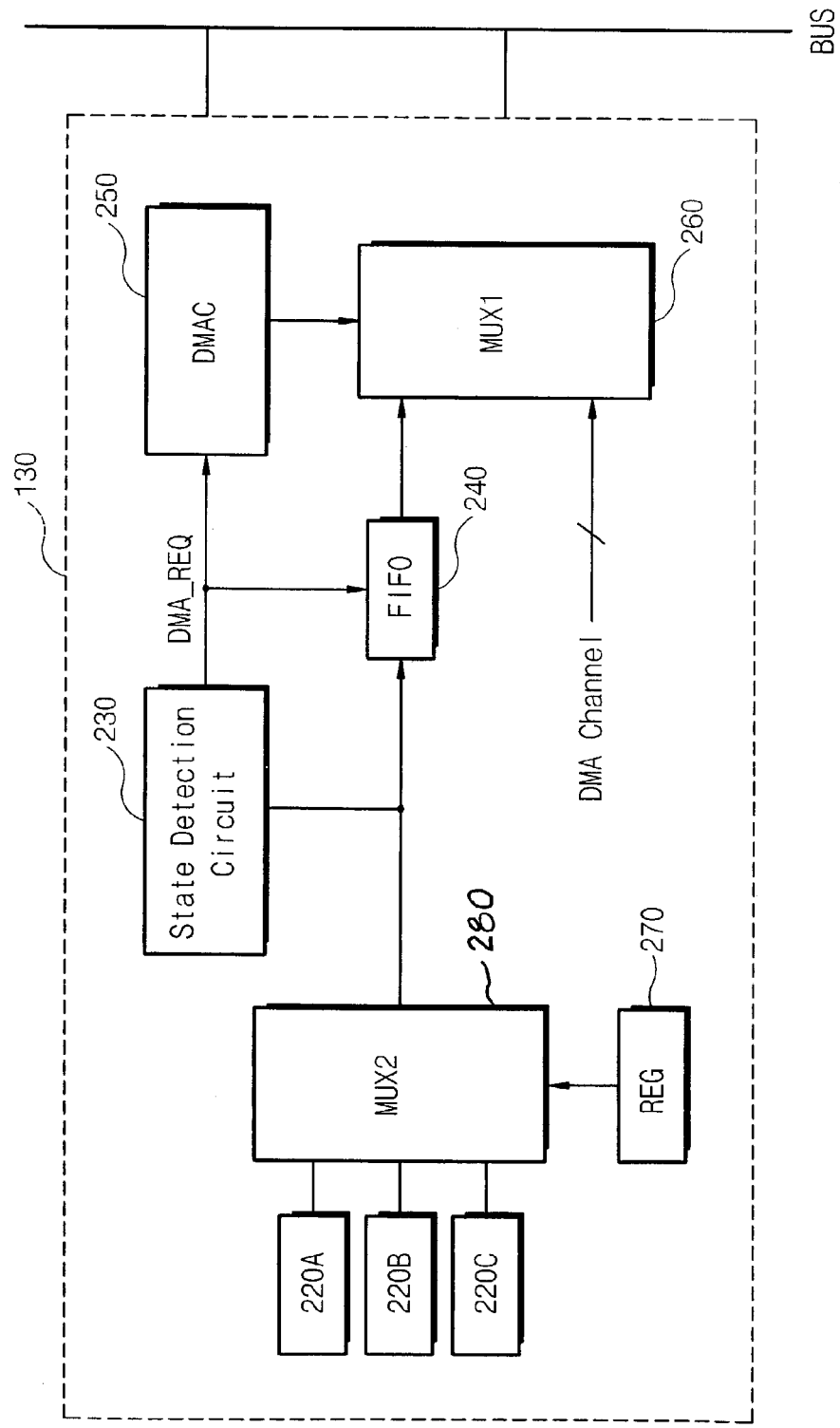
FIG. 5 is a block diagram of a peripheral device according to a modified embodiment of the present invention.

Referring to FIG. 5, a peripheral device 130 is connected to an internal bus BUS and includes a plurality of state registers 220A, 220B, and 220C, a state detection circuit 230, a FIFO 240, a direct memory access controller 250, first and second multiplexers 260 and 280, and a user register 270. Corresponding function blocks (not shown) are connected to the state registers 220A, 220B, and 220C, respectively. Information for selecting one of the state registers 220A, 220B, and 220C is stored in the user register 270. That is, the multiplexer 280 selects one of the state registers 220A, 220B, and 220C in response to the selection information stored in the user register 270. The variation of operation state information of the selected state register is detected in the state detection circuit 230 in the same manner as described above, and then stored in an external memory 160. This operation is the same as previously described in FIG. 2.

An embedded controller or a microcontroller according to a second embodiment of the present invention is now described below with reference to FIG. 6.

Figure 6:
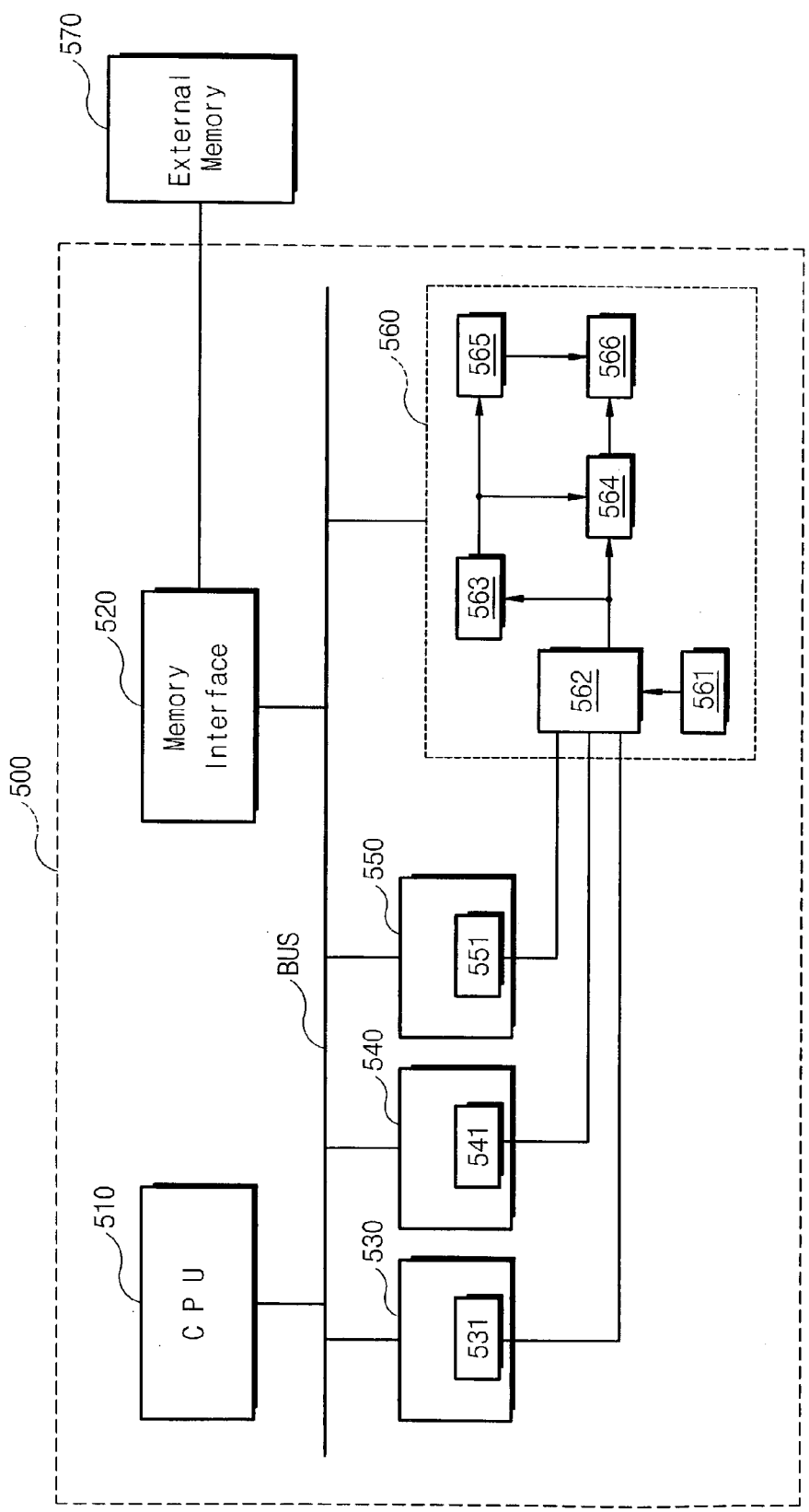
FIG. 6 is a block diagram of an embedded controller or microcontroller according to a second embodiment of the present invention.

Referring to FIG. 6, an embedded controller or microcontroller 500 includes an internal bus denoted as "BUS" and is connected to an external memory 570. A central processing unit (CPU) 510 operating as an execution unit, a memory interface 520 operating as a memory controller, a plurality of peripheral devices 530, 540, and 550 operating as a function block, and a backup control device 560 are connected to the internal bus BUS. All components of the embedded controller or microcontroller 500 are mounted on the same semiconductor substrate (or chip).

The peripheral devices 530, 540, and 550 each include state registers 531, 541, and 551, respectively. The state registers 531, 541, and 551 are connected to the backup control device 560. The backup control device 560 includes a user register 561, a first switch 562, a state detection circuit 563, a FIFO 564, a DMA controller 565, and a second switch 566. Selection information for selecting one of the state registers 531, 541, and 551 is stored in the user register 561. The first switch 562 selects one of the sate registers 531, 541, and 551 in response to the selection information stored in the user register 561.

The state detection circuit 563 detects whether a value of data stored in the selected state register is varied. According to the detection result, the state detection circuit 563 selectively activates a DMA request signal DMA_REQ. The state detection circuit 230 is composed in the same manner as that shown above in FIG. 3 and will not be described in further detail. The FIFO 564 receives the operation state information stored in the selected state register when the DMA request signal DMA_REQ is activated. The DMA controller 565 communicates with the CPU 510 through the internal bus BUS in response to the activation of the DMA request signal DMA_REQ. That is, the DMA controller 565 requests the CPU 510 to use a bus when the DMA request signal DMA_REQ from the state detection circuit 563 is activated. When the use of the bus is approved, the DMA controller 565 activates the switch 566. Data from the FIFO 564 is transmitted to the internal bus BUS through the switch 566. Accordingly, the data (or operation state information) transmitted to the internal bus BUS is stored in an external bus 160 through the memory interface 120.

During circuit operation, firstly, selection information for selecting a peripheral device under test is stored in the user register 561. For example, assuming that information for selecting the state register 531 of the peripheral device 530 is stored in the user register 561, the first switch 562 selects the state register 531 of the peripheral device 530. The state detection circuit 563 detects whether the operation state information stored in the selected state register 531 is varied. When it is varied, the state detection circuit 563 activates the DMA request signal DMA_REQ. The FIFO 564 stores the varied operation state information of the selected state register 531 depending upon the activation of the DMA request signal DMA_REQ. At the same time, the DMA controller 565 requests use of the bus from the CPU 510. Next, when the use of the bus is approved, the DMA controller 565 controls the second switch 566 to transmit the data stored in the FIFO to the internal bus BUS. The data stored in the internal bus BUS, i.e., the operation state information of the selected state register 531, is stored in the external memory 570 through the memory interface 520 according to conventional means.

As explained above, all state information related to operation of the function blocks can be stored in an external memory in real time without having an effect on the operation of a central processing unit (CPU), even though additional test pins are not used. The information stored in the external memory may be used to debug, for example, the function blocks or peripheral devices. In this case, the operation of the function blocks or peripheral devices can be precisely determined, in real-time, through standard debugging techniques.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A single-chip control device having a central processing unit and a memory interface for interfacing with an external memory, the single-chip control device comprising:
    at least one function block;
    a first register for storing operation state information of the function block;
    a state detection circuit for activating a flag signal when the operation state information of the first register is varied;
    a storage unit for storing the operation state information of the first register in response to the flag signal; and
    a control circuit for transmitting the operation state information of the storage unit to an internal bus in response to the flag signal in order to store the operation state information of the storage unit in the external memory through the memory interface.

2. The single-chip control device of claim 1, wherein the control device comprises:
    a switch for transmitting the operation state information of the storage unit to the internal bus in response to a switch control signal; and
    a direct memory access controller for generating the switch control signal in response to the flag signal.

3. The single-chip control device of claim 2, wherein the direct memory access controller issues a bus request to the central processing unit when the flag signal is activated, and activates the switch control signal upon approval by the central processing unit of the use of the bus.

4. The single-chip control device of claim 1, wherein the state detection circuit comprises:
    a second register for storing operation state information output by the first register in synchronization with a clock signal; and
    a comparator for activating the flag signal depending upon whether an output of the first register is identical with an output of the second register.

5. The single-chip control device of claim 4, wherein the first and second registers constitute a shift register operating in synchronization with the clock signal.

6. The single-chip control device of claim 1, wherein the storage unit comprises a FIFO.

7. A single-chip control device comprising:
    at least one peripheral device connected to an internal bus; and
    a memory interface for interfacing with an external memory, the memory interface being connected to the internal bus,
    wherein the peripheral device comprises:
        a state register for storing operation state information of an internal functional block;
        a state detection circuit for activating a flag signal when the operation state information of the state register is varied;
        a storage unit for storing the operation state information of the state register in response to the flag signal;
        a switch for transmitting the operation state information of the storage unit to the internal bus in response to a switch control signal; and
        a direct memory access controller for generating the switch control signal in response to the flag signal.

8. The single-chip control device of claim 7, wherein the direct memory access controller issues a bus request to the central processing unit when the flag signal is activated, and activates the switch control signal upon approval by the central processing unit of the use of the bus.

9. The single-chip control device of claim 7, wherein the state detection circuit comprises:
    a comparison register for storing the operation state information output by the state register in synchronization with a clock signal; and
    a comparator for activating the flag signal depending upon whether an output of the state register is identical with an output of the comparison register.

10. The single-chip control device of claim 9, wherein the state register and the comparison register constitute a shift register operating in synchronization with the clock signal.

11. The single-chip control device of claim 7, wherein the storage unit comprises a FIFO.

12. A single-chip control device comprising:
    a central processing unit;
    a memory interface for interfacing with an external memory, the memory interface being connected to an internal bus;
    at least one peripheral device for storing operation state information of an internal function block in a state register, the peripheral device being connected to the internal bus; and
    a backup control block for communicating with the central processing unit and contemporaneously storing the operation state information of the state register,
    wherein when the operation state information of the state register is varied, the backup control block stores the operation state information of the state register in the external memory by communicating with the central processing unit.

13. The single-chip control device of claim 12, wherein the backup control block comprises:
    a state detection circuit for activating a flag signal whenever the operation state information of the state register is varied;
    a FIFO for storing the operation state information of the state register in response to the flag signal;
    a switch for transmitting the operation state information of the FIFO to the internal bus in response to a switch control signal; and
    a direct memory access controller for generating the switch control signal in response to the flag signal.

14. The single-chip control device of claim 13, wherein the direct memory access controller issues a bus request to the central processing unit when the flag signal is activated, and activates the switch control signal upon approval by the central processing unit of the use of the bus.

15. The single-chip control device of claim 13, wherein the state detection circuit comprises:

a comparison register for storing the operation state information output by the state register in synchronization with a clock signal; and a comparator for activating the flag signal depending upon whether an output of the state register is identical with an output of the comparison register.

16. The single-chip control device of claim 15, wherein the state register and the comparison register constitute a shift register operating in synchronization with the clock signal.

17. A single-chip control device comprising:

a central processing unit;

a memory interface for interfacing with an external memory, the memory interface being connected to an internal bus;

a plurality of peripheral devices each having a state register for storing operation state information of an internal function block, the peripheral devices being connected to the internal bus; and a backup control block for communicating with the central processing unit and contemporaneously storing the operation state information transmitted from selected one of the state registers in the peripheral devices, wherein when the operation state information of the state register is varied, the backup control block stores the operation state information of the state register in the external memory by communicating with the central processing unit.

18. The single-chip control device of claim 17, wherein the backup control block comprises:

a first selection circuit for selecting one operation state information among all operation state information output by the state registers of the peripheral devices;

a state detection circuit for activating a flag signal when the operation state information from the selected state register is varied;

a FIFO for storing the operation state information of the selected state register in response to the flag signal;

a switch for transmitting the operation state information of the FIFO to the internal bus in response to a switch control signal; and a direct memory access controller for generating the switch control signal in response to the flag signal.

19. The single-chip control device of claim 18, wherein the direct memory access controller issues a bus request to the central processing unit when the flag signal is activated, and activates the switch control signal upon approval by the central processing unit of the use of the bus.

20. The single-chip control device of claim 17, wherein the state detection circuit comprises:

a comparison register for storing the operation state information output by the state register in synchronization with a clock signal; and a comparator for activating the flag signal depending upon whether an output of the state register is identical with an output of the comparison register.

21. A data backup method of a single-chip control device having a central processing unit, a peripheral device with a state register for storing operation state information, and a memory interface for interfacing with an external memory, the data backup method comprising:

detecting whether operation state information of the state register is varied;

storing the operation state information in a storage unit when the operation state information of the state register is varied, and simultaneously issuing a request to the central processing unit for use of a bus; and storing the operation state information stored in the storage unit in the external memory when the use of the bus is approved.

22. The method of claim 21, wherein the storage unit comprises a FIFO.

* * * * *